US011710330B2

(12) United States Patent
Evans et al.

(10) Patent No.: US 11,710,330 B2
(45) Date of Patent: Jul. 25, 2023

(54) REVEALING CONTENT REUSE USING COARSE ANALYSIS

(71) Applicant: Microsoft Technology Licensing, LLC, Redmond, WA (US)

(72) Inventors: Nathan Roy Evans, Bremerton, WA (US); Christopher Miles White, Seattle, WA (US); Jonathan Karl Larson, Bremerton, WA (US); Darren Keith Edge, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 16/460,980

(22) Filed: Jul. 2, 2019

(65) Prior Publication Data
US 2021/0004583 A1    Jan. 7, 2021

(51) Int. Cl.
*G06F 16/906* (2019.01)
*G06F 16/901* (2019.01)
(Continued)

(52) U.S. Cl.
CPC .......... *G06V 30/414* (2022.01); *G06F 16/906* (2019.01); *G06F 16/9014* (2019.01);
(Continued)

(58) Field of Classification Search
CPC ............ G06K 9/00463; G06K 9/00469; G06F 16/906; G06F 16/9014; G06F 16/9024;
(Continued)

(56) References Cited

U.S. PATENT DOCUMENTS 6,920,448 B2 * 7/2005 Kincaid ................ G06F 16/951
707/999.003
7,519,605 B2 * 4/2009 Vailaya ................ G06F 16/951
707/999.005
(Continued)

OTHER PUBLICATIONS

Beck, Melanie. "ML Security Pro Tips: Understanding MinHash in a Security Context", AI/ML at Symantec, Feb. 25, 2019 (Year: 2019) (Year: 2019).*
(Continued)

*Primary Examiner* — Phong H Nguyen
(74) *Attorney, Agent, or Firm* — Schwegman Lundberg & Woessner, P.A.

(57) ABSTRACT

Systems and methods for managing content provenance are provided. A network system accesses a plurality of documents. The plurality of documents is then hashed to identify one or more content features within each of the documents. In one embodiment, the hash is a MinHash. The network system compares the content features of each of the plurality of documents to determine a similarity score between each of the plurality of documents. In one embodiment, the similarly score is a Jaccard score. The network system then clusters the plurality of documents into one or more clusters based on the similarity score of each of the plurality of documents. In one embodiment, the clustering is performed using DBSCAN. DBSCAN can be iteratively performed with decreasing epsilon values to derive clusters of related but relatively dissimilar documents. The clustering information associated with the clusters are stored for use during runtime.

19 Claims, 8 Drawing Sheets

(51) Int. Cl.
*G06F 40/216* (2020.01)
*G06V 30/414* (2022.01)
*G06V 30/416* (2022.01)

(52) U.S. Cl.
CPC ........ *G06F 16/9024* (2019.01); *G06F 40/216* (2020.01); *G06V 30/416* (2022.01)

(58) Field of Classification Search
CPC .... G06F 40/216; G06F 16/355; G06F 16/358; G06F 16/35
USPC .................................. 707/722, 724, 737, 798
See application file for complete search history.

(56) References Cited

U.S. PATENT DOCUMENTS

| | | | | |
|---|---|---|---|---|
| 8,108,393 | B2* | 1/2012 | Yang | G06F 16/951 707/913 |
| 10,013,488 | B1 | 7/2018 | Zhao et al. | |
| 10,430,693 | B1 | 10/2019 | Tung et al. | |
| 10,515,265 | B2* | 12/2019 | Asi | G06K 9/6255 |
| 2002/0169764 | A1* | 11/2002 | Kincaid | G06F 16/951 707/999.003 |
| 2004/0153445 | A1* | 8/2004 | Horvitz | G06F 16/40 707/999.003 |
| 2005/0222901 | A1* | 10/2005 | Agarwal | G06Q 30/02 705/14.54 |
| 2005/0278321 | A1* | 12/2005 | Vailaya | G16B 50/30 707/999.003 |
| 2008/0205776 | A1* | 8/2008 | Shafirstein | G06V 20/695 382/232 |
| 2010/0145952 | A1 | 6/2010 | Yoon et al. | |
| 2011/0270606 | A1 | 11/2011 | Crochet et al. | |
| 2013/0041877 | A1* | 2/2013 | Parthasarathy | G06F 16/907 707/723 |
| 2013/0151531 | A1* | 6/2013 | Li | G06Q 50/01 707/E17.089 |
| 2014/0082006 | A1 | 3/2014 | Knight et al. | |
| 2016/0132521 | A1 | 5/2016 | Reininger et al. | |
| 2016/0188590 | A1 | 6/2016 | Cole et al. | |
| 2016/0379232 | A1 | 12/2016 | Alonso et al. | |
| 2017/0322930 | A1 | 11/2017 | Drew | |
| 2018/0067910 | A1* | 3/2018 | Alonso | H04L 67/306 |
| 2018/0137115 | A1* | 5/2018 | Klein | G06F 16/313 |
| 2018/0181805 | A1* | 6/2018 | Asi | G06F 18/00 |
| 2019/0347319 | A1 | 11/2019 | Goyal et al. | |
| 2020/0300654 | A1* | 9/2020 | Bravi | G01C 21/28 |
| 2020/0314117 | A1* | 10/2020 | Nguyen | G06F 21/552 |
| 2020/0387743 | A1* | 12/2020 | Wick | G06F 16/2228 |
| 2021/0004582 | A1 | 1/2021 | Evans et al. | |
| 2021/0004583 | A1 | 1/2021 | Evans et al. | |

OTHER PUBLICATIONS

"Bing helps you learn more about the news in less time", Retrieved From: https://blogs.bing.com/search/2018-08/Bing-helps-you-learn-more-about-the-news-in-less-time, Aug. 27, 2018, 6 Pages.
"Jigsaw", Retrieved From: https://web.archive.org/web/20190401171703/https://jigsaw.google.com/, Apr. 1, 2019, 1 Page.
"Rogeting", Retrieved From: https://web.archive.org/web/20170416070248/https:/en.wikipedia.org/wiki/Rogeting, Apr. 16, 2017, 2 Pages.
"Scientometrics", Retrieved From: https://web.archive.org/web/20190428074832/https://en.wikipedia.org/wiki/Scientometrics, Apr. 28, 2019, 5 Pages.
"Stylometry", Retrieved From: https://web.archive.org/web/20190401083503/https://en.wikipedia.org/wiki/Stylometry, Apr. 1, 2019, 9 Pages.
Burt, Tom, Announcing the Defending Democracy Program, Retrieved From: https://blogs.microsoft.com/on-the-issues/2018/04/13/announcing-the-defending-democracy-program/, Apr. 13, 2018, 3 Pages.
Shum, Harry, "Democratization of AI", Retrieved From: https://events.technologyreview.com/video/watch/harry-shum-democratization-ai/, Mar. 25, 2019, 4 Pages.
Shum, Harry, "Five things to know about the next cycle of AI innovation—AI Creation", Retrieved From: https://www.linkedin.com/pulse/five-things-know-next-cycle-ai-innovation-creation-harry-shum/, Mar. 26, 2019, 5 Pages.
Smith, Brad, "Today in Technology: The Top 10 Tech Issues for 2019", Retrieved From: https://www.linkedin.com/pulse/today-technology-top-10-tech-issues-2019-brad-smith/?published=t, Jan. 8, 2019, 8 Pages.
Bendersky, et al., "Finding Text Reuse on the Web", In Proceedings of the Second ACM International Conference on Web Search and Data Mining, Feb. 9, 2009,10 Pages.
Clough, et al., "METER: MEasuring TExt Reuse", In Proceedings of the 40th Annual Meeting of the Association for Computational Linguistics (ACL), Jul. 6, 2002, pp. 152-159.
De Nies, et al., "Automatic Discovery of High-level Provenance Using Semantic Similarity", In Proceedings of International Provenance and Annotation Workshop, Jun. 19, 2012, pp. 97-110.
Flintham, et al., "Falling for Fake News: Investigating the Consumption of News via Social Media", In Proceedings of the CHI Conference on Human Factors in Computing Systems, Apr. 21, 2018, pp. 1-10.
Groth, et al., "Requirements for Provenance on the Web", In the International Journal of Digital Curation, vol. 7, Issue 1, Mar. 9, 2012, pp. 39-56.
Horne, et al., "An Exploration of Verbatim Content Republishing by News Producers", In repository of arXiv, arXiv:1805.05939, May 15, 2018, 10 Pages.
Schwarz, et al., "Augmenting Web Pages and Search Results to Support Credibility Assessment", In Proceedings of the SIGCHI Conference on Human Factors in Computing Systems, May 7, 2011, 10 Pages.
Seo, et al., "Local Text Reuse Detection", In Proceedings of the 31st Annual International Acm Sigir Conference on Research and Development in Information Retrieval (SIGIR'08), Jul. 20, 2008, 8 Pages.
"International Search Report and Written Opinion Issued in PCT Application No. PCT/US20/033895", dated Aug. 17, 2020, 12 Pages.
"International Search Report and Written Opinion Issued in PCT Application No. PCT/US20/034109", dated Aug. 17, 2020, 15 Pages.
U.S. Appl. No. 16/460,987, filed Jul. 2, 2019, Revealing Content Reuse Using Fine Analysis.
"Non Final Office Action Issued in U.S. Appl. No. 16/460,967", dated Jun. 15, 2021, 49 Pages.
"Notice of Allowance Issued in U.S. Appl. No. 16/460,967", dated Feb. 11, 2022, 10 Pages.

* cited by examiner

REVEALING CONTENT REUSE USING COARSE ANALYSIS

TECHNICAL FIELD

The subject matter disclosed herein generally relates to special-purpose machines that facilitate revealing content reuse, and to the technologies by which such special-purpose machines become improved compared to other machines that reveal content reuse. Specifically, the present disclosure addresses systems and methods that identifies content reuse based on connections between documents at a document level.

BACKGROUND

The media industry typically reuses news content. Conventionally, a small number of publishers originate content with a large number of other publishers duplicating or republishing the content. With the proliferation of content distribution on the Internet, it is difficult to identify where news originated from and how it is spreading. This allows for misinformation, disinformation, and plagiarism.

BRIEF DESCRIPTION OF DRAWINGS

Various ones of the appended drawings merely illustrate example embodiments of the present invention and cannot be considered as limiting its scope.

FIGS. 5A-5C are example user interfaces that illustrate the use of content provenance information.

DETAILED DESCRIPTION

Figure 1:
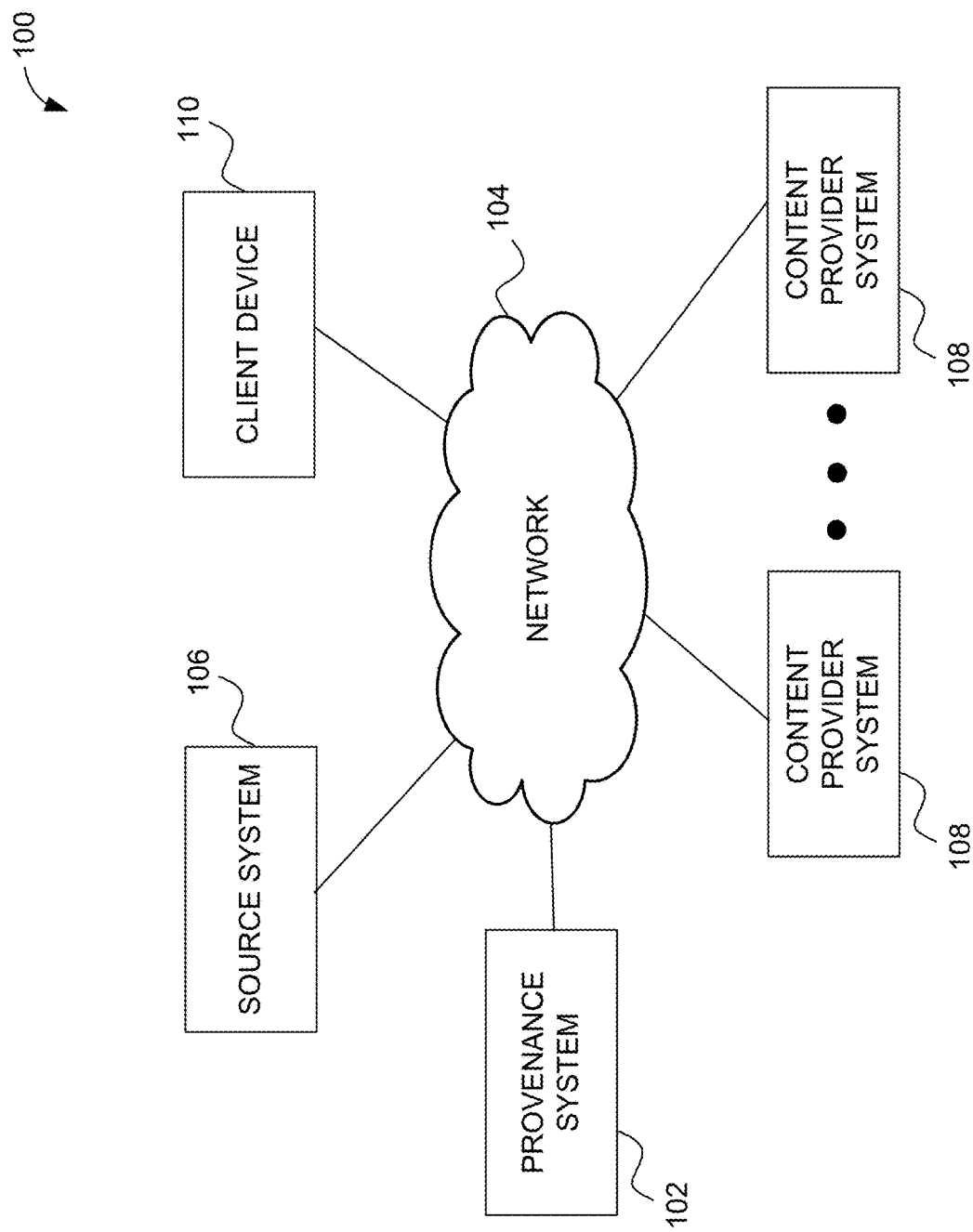
FIG. 1 is a diagram illustrating a network environment suitable for providing content provenance, according to some example embodiments.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments are directed to a system and method that identifies source documents for content that is reused and identifies how the content has been modified or republished over time. This process is also referred to as content provenance. In particular, the system uses similarity measurements or scores to trace content of a document back to its source(s) and reconstruct the provenance. In example embodiments, the document comprises a news article. However, the document may contain any type of content that is reused or republished in addition to original content. In example embodiments, the system accesses a plurality of documents. The plurality of documents may be associated with a particular subject matter or be for a particular period of time. Each of the plurality of documents is then hashed to identify one or more content features within each of the documents. In one embodiment, the hashing is MinHash. In a further embodiment, Locality Sensitive Hashing (LSH) can be used with MinHash to quickly find related documents. The network system compares the content features of each of the plurality of documents to determine a similarity score between each of the plurality of documents. In one embodiment, the similarity score is a Jaccard score. The network system then clusters the plurality of documents into one or more clusters based on the similarity score of each of the plurality of documents. In one embodiment, the clustering is performed using DBSCAN. The clustering information associated with the one or more clusters are stored in a data store for use during runtime.

At run time, the system accesses the data store and identifies clusters that correspond to a topic that is selected for display. Once the clusters are identified, a document from each of the clusters is selected. In one embodiment, the selected document is the oldest document in a cluster (e.g., a likely source of the other documents in the cluster). In an alternative embodiment, the selected document is a document have the most copied headline (or title) or a document with the greatest amount of reused content. The copying can be based on a fuzzy match. The selected documents are then presented on a user interface to a requesting user. The user can request additional data for any of the documents displayed on the user interface. The additional data can include, for example, a number of documents within the same cluster, top terms, unique terms, a publication timeline that indicates when the document was published and how it compares to publication of other documents in the cluster, or other documents from the same cluster.

Thus, the present disclosure provides technical solutions for managing content provenance that is automated and not subject to human bias or opinion. In particular, the system identifies clusters of related documents and likely source documents within each cluster. In particular, within a cluster or the document set as a whole, the system uses publication time and document similarity to show a hierarchy and progression of content specialization—from high-level topics to stories to articles (e.g., documents) and their low-level variations. As a result, one or more of the methodologies described herein facilitate solving technical problems associated with managing and analyzing large sets of documents (e.g., thousands to millions of documents) to reconstruct content provenance. By providing a provenance system that analyzes the documents using various hashing and clustering algorithms, example embodiments automate a process that is essentially humanly impossible to perform given the sheer number of documents published on a daily basis.

FIG. 1 is a block diagram illustrating an example environment 100 for providing content provenance, in accordance with an example embodiment. In example embodiments, a provenance system 102 is a network system comprising one or more servers that traces content back to its sources based on similarity measures of the documents. Accordingly, the provenance system 102 comprises components that analyze documents (e.g., accessible on the Internet, on a private intranet, or other text collection) and generates clusters of related documents. In one embodiment, an oldest document within a cluster is considered the source of the associated content. The provenance system 102 will be discussed in more detail in connection with FIG. 2 below.

The provenance system 102 accesses, via a communication network 104, a plurality of documents from a source system 106. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The source system 106 comprises a source of the documents that the provenance system 102 analyzes. In one embodiment, the source system 106 is a web search engine (e.g., Bing) with access to web content and documents from a plurality of content provider systems 108. In a news embodiment, the source system 106 may include a news vertical that provides access to news documents available on the Internet.

The content provider systems 108 are systems of content originators and publishers. In example embodiments, the content provider systems 108 comprises one or more servers. Content originators generate the content and may be the source of an original document (also referred to herein as the "source document"). Content publishers may be originators or may use content from originators in generating documents (e.g., publications, new stories) that republish a portion of content generated by the originator.

A client device 110 is a device of a user accessing content via the communications network 104. For example, the user may be an individual interested in viewing news articles about a particular topic and seeing different perspectives on the topic, whereby the different perspectives are selected based on coarse clustering as discussed in more detail below. The client device 110 may comprise, but is not limited to, a smartphone, tablet, laptop, multi-processor system, microprocessor-based or programmable consumer electronic, game console, set-top box, a server, or any other communication device that the user may utilize to access the provenance system 102. In some embodiments, the client device 110 comprises a display module (not shown) to display information (e.g., in the form of user interfaces). In further embodiments, the client device 110 comprises one or more of a touch screen, accelerometer, camera, microphone, and Global Positioning System (GPS) device. The client device 110 may include one or more applications (also referred to as "apps") such as, but not limited to, a web browser, messaging application, electronic mail (email) application, and the like.

In example embodiments, any of the systems or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device. For example, the provenance system 102 and the source system 106 may be combined within a single system or be controlled by a single entity. Additionally, some of the functions of the provenance system 102 may be performed at the source system 106 or vice-versa. Furthermore, the functions described herein for any single system or device may be subdivided among multiple systems or devices. Additionally, any number of provenance systems 102, source systems 106, content provider systems 108, or client devices 110, may be embodied within the network environment 100. Further still, some components or functions of the network environment 100 may be combined or located elsewhere in the network environment 100.

Figure 2:
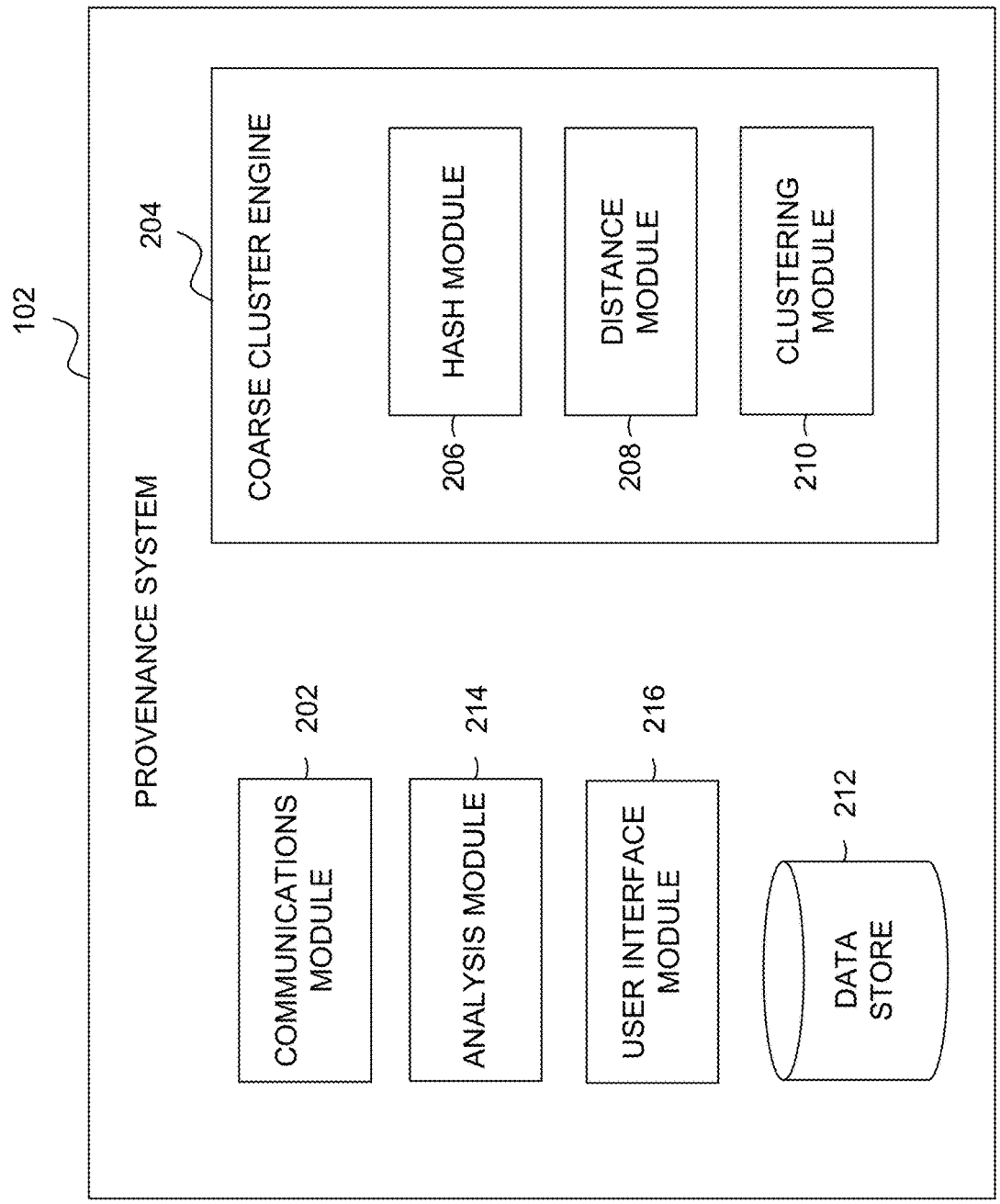
FIG. 2 is a block diagram illustrating components of a provenance system, according to some example embodiments.

FIG. 2 is a block diagram illustrating components of the provenance system 102, according to example embodiments. The provenance system 102 comprises components that analyze documents, cluster the documents into groupings of related documents, and stores and provides analysis information regarding the relatedness of documents and their source(s). To enable these operations, the provenance system 102 comprises a communications module 202, a coarse cluster engine 204, an analysis module 214, a user interface module 216, and a data store 212 all configured to communicate with each other (e.g., via a bus, shared memory, or a switch). The provenance system 102 may also comprise other components (not shown) that are not pertinent to example embodiments. Furthermore, any one or more of the components (e.g., engines, modules, storage) described herein may be implemented using hardware (e.g., a processor of a machine) or a combination of hardware and software. Moreover, any two or more of these components may be combined into a single component, and the functions described herein for a single component may be subdivided among multiple components. Further still, some of the components of the provenance system 102 may be located at the source system 106 in one embodiment.

The communications module 202 manages exchange of communications with the source system 106 and the client device 110. Specifically, the communications module 202 accesses (e.g., retrieves, receives) a plurality of documents (also referred to as "document set") from the source system 106 to be analyzed. In some embodiments, the documents that are accessed are based on a query of a general subject matter that the communications module 202 transmits to the source system 106. The general subject matter may, for example, be a name (e.g., an individual, organization, country), a category (e.g., economy, sports), or a topic (e.g., gun control, school vouchers). In response, the source system 106 presents the provenance system 102 with documents (or a list of documents) associated with the queried subject matter. The query may also include a time period for when the documents were published (e.g., last three months). As a result, the documents are accessed via the communications module 202.

The communications module 202 also exchanges communications, via the network 104, with the client device 110. For instance, when a user of the client device 110 requests additional information for a document they are viewing, the communications module 202 receives the request from the client device 110 and responds with the requested information as will be discussed in more detail below.

The coarse cluster engine 204 is configured to generate clusters of related documents based on similarity of content within the documents. The coarse cluster engine 204 uses a machine learning technique to group documents into collections or clusters that share some common content features. The coarse cluster engine 204 is able to identify documents that are so similar that the documents probably derived from a common source or source document. To enable this process, the coarse cluster engine 204 comprises a hash module 206, a distance module 208, and a clustering module 210.

In example embodiments, the hash module 206 hashes the document accessed by the communication module 202. More specifically, the plurality of documents is reduced to a lower-dimensional representation that allows for distance-based or similarity-based comparisons between documents that would otherwise be infeasible. In one embodiment, the hash module 206 performs MinHash (the min-wise independent permutations locality sensitive hashing scheme) by taking all of the accessed documents (e.g., for a given subject matter) and reducing the documents down to a set of fixed dimensions. MinHash operates on sets of document elements (e.g., words or n-grams) and estimates the Jaccard similarity of these sets for pairs of documents under comparison without needing to examine each element in each comparison or store each set in memory (as would be required for a full Jaccard comparison). In one embodiment, the documents are reduced to 256 dimensions, which effectively reduces the documents down to select content features generated by 256 hash functions. Alternative dimensionality-reduction approaches that are not conventionally referred to as hashing may also be used including text embedding methods such as doc2vec. In a further embodiment, Locality Sensitive Hashing (LSH) can be used with MinHash to quickly find related documents. For example, LSH can be run over the MinHash representation to construct a similarity matrix of all documents to one another.

Specifically, the coarse cluster engine 204 attempts to estimate the Jaccard similarity coefficient sets A and B, calculated as |A∩B|/|A∪B|. MinHash does this in a way that is mathematically equivalent to randomly sampling from the A∪B and checking for membership in A∩B. This check returns a 1 for a match and a 0 for no match. An average over all values will give the actual Jaccard score, but this can be expensive for large sets of A∪B. As such, example embodiments average over a fixed number of random samples (e.g., k=256). The result of the hash module 206 is a vector of 1s and 0s based on which of the k hash functions (for each of k permutations) results in a same minimum hash value for elements of A and B. The vector is equivalent to a binary number and may be encoded as an integer. In some cases, a fuzzy match is derived whereby for a given segment of text (e.g., a paragraph) having minor changes between two documents, an exact same vector is output. In other cases, minor changes may result in different vectors. For example, minor changes may result in small changes to the binary hash components (changes 0<=>1) that only slightly reduce the similarity between the hash vectors (and can thus be interpreted as small differences). Minor changes may also go undetected if the changes occurred in document elements not sampled by one of the k hash functions.

The distance module 208 is configured to determine similarities between each of the documents in the document set. In example embodiments, the distance module 208 runs a pairwise Jaccard scoring between all document MinHash values (the MinHash vectors). Jaccard scores express a ratio of overlapping content features between two documents (e.g., how many hashes in a first document are the same as hashes in a second document and how many are different). Documents with higher overlapping content features are, therefore, more similar to each other. The result is a distance matrix between all documents with each other document in the document set. Because the Jaccard score is a ratio, it has allowable values in the range 0 to 1, whereby 0 indicates no overlap and 1 means a perfect overlap. In other words, every document in the document set will have a single number that indicates what ratio of overlap there is with every other document in the document set.

The clustering module 210 groups the documents in the document set into clusters whereby the documents within each cluster are similar to each other. In example embodiments, the clustering module 210 uses DBSCAN (density-based spatial clustering of applications with noise) to calculate cluster boundaries. The Jaccard score for each pairwise document comparison comprises the distance function used in the DBSCAN. The primary tuneable parameter in DBSCAN is the minimum density to allow for cluster formation, otherwise known as "epsilon." Epsilon essentially establishes a size of a radius with a larger value of epsilon expanding the radius to create a coarser cluster. However, the use of Jaccard similarity results in an inversion of epsilon. That is, for example, setting a Jaccard requirement to 0 effectively sets epsilon to the maximum value 1.0) required to capture points (e.g., documents) in a single cluster. For instance, if the Jaccard requirement is 0.70 (e.g., epsilon=0.3), then the clusters will have documents having defining content that is roughly a minimum of 70% similar. The Jaccard requirement may be predetermined (e.g., a default) or set by a human operator of the provenance system 102. In some embodiments, the Jaccard requirement may be variable based on the subject matter of the documents.

The coarse cluster engine 204 can also determine how content similarity evolves by running the clustering algorithm (e.g., DBSCAN) several times with different epsilon values to produce different cluster formations. At a Jaccard value of 0.0, all documents will be clustered together since the clustering algorithm is instructed that no overlap is necessary to form a cluster, while a Jaccard value of 1.0 results in clusters where all of the documents are duplicates. As such, these similarity values or scores can be considered as a sliding scale from "coarse" clusters centered around a subject matter, all the way to a "fine" cluster where the documents are essentially copies of a source document. By running the clustering algorithm at multiple evenly-spaced epsilon values between 0 and 1, clusters at each level are generated resulting in a hierarchy of text or content variation. This hierarchy indicates how a given topic fragments into different threads and eventually into duplications. Additionally, the hierarchy allows the analysis module 214 to identify smaller more similar clusters from which to provide even more specific documents (by using clusters with higher epsilon values).

To accomplish the hierarchy construction, the DBSCAN clustering algorithm, for example, is performed at all levels of epsilon from 0.0 to 1.0 in increments of 0.01 (i.e., from 100% to 0% similarity in 1% increments). However, it may not be useful to show clusters with 0% or extremely low overlap. As such, heuristics can be used to find an optimal number of clusters and start there for the epsilon value. In one embodiment, the optimal epsilon value is in the range of 0.30 to 0.65. Once a set of clusters at every epsilon value within the optimal range is determined, the clustering module 210 converts the data into a hierarchy. Because DBSCAN uses item density as its measure, documents will always have exactly one membership at each epsilon value (e.g., clusters cannot overlap). As the density requirement is tightened, sub-clusters split off in a predictable manner. Those sub-clusters can be identified by tracing the lineage of a representative document for each cluster from the most fine cluster all the way up to the coarse level.

The Jaccard scores, clustering information, and/or information on the documents are stored to the data store 212. During runtime, the data store 212 is accessed to quickly find, for example, related documents (e.g., from the same cluster) and a likely source of a document. While the data store 212 is shown as being a part of the provenance system 102, alternatively, the data store 212 may be located elsewhere in the network environment 100.

At runtime, the provenance system 102 receives, via the communications module 202, an indication to present related documents to a user at the client device 110. The indication may be received from the client device 110 directly or via the source system 106. In one example, the user is viewing a document and wants to see related documents from the same cluster. In another example, the user provides a query for a particular topic. In response to the query, the analysis module 214 accesses the data store 212 and determines the cluster(s) associated with the query. In one embodiment, the analysis module 214 selects a document from each cluster identified from the query, whereby the selected document is "representative" of the content in its cluster.

The user interface (UI) module 216 causes the presentation of the response to the request. For instance, the UI module 216 transmits instructions for presenting information regarding the related documents or analysis information for documents. For example, the UI module 216 can present information that allows the user to visually review clusters by Looking at a single document or compare two clusters by looking directly at their respective document content. The UI module 216 can also present the source document for a cluster. In one embodiment, the source of the document is an earliest published document in the cluster. In an alternative embodiment, the source document is the document with the most copied headline (or a most copied document in the cluster). Examples of various runtime user interfaces are discussed in more detail in connection with FIG. 5A to 5C below.

Figure 3:
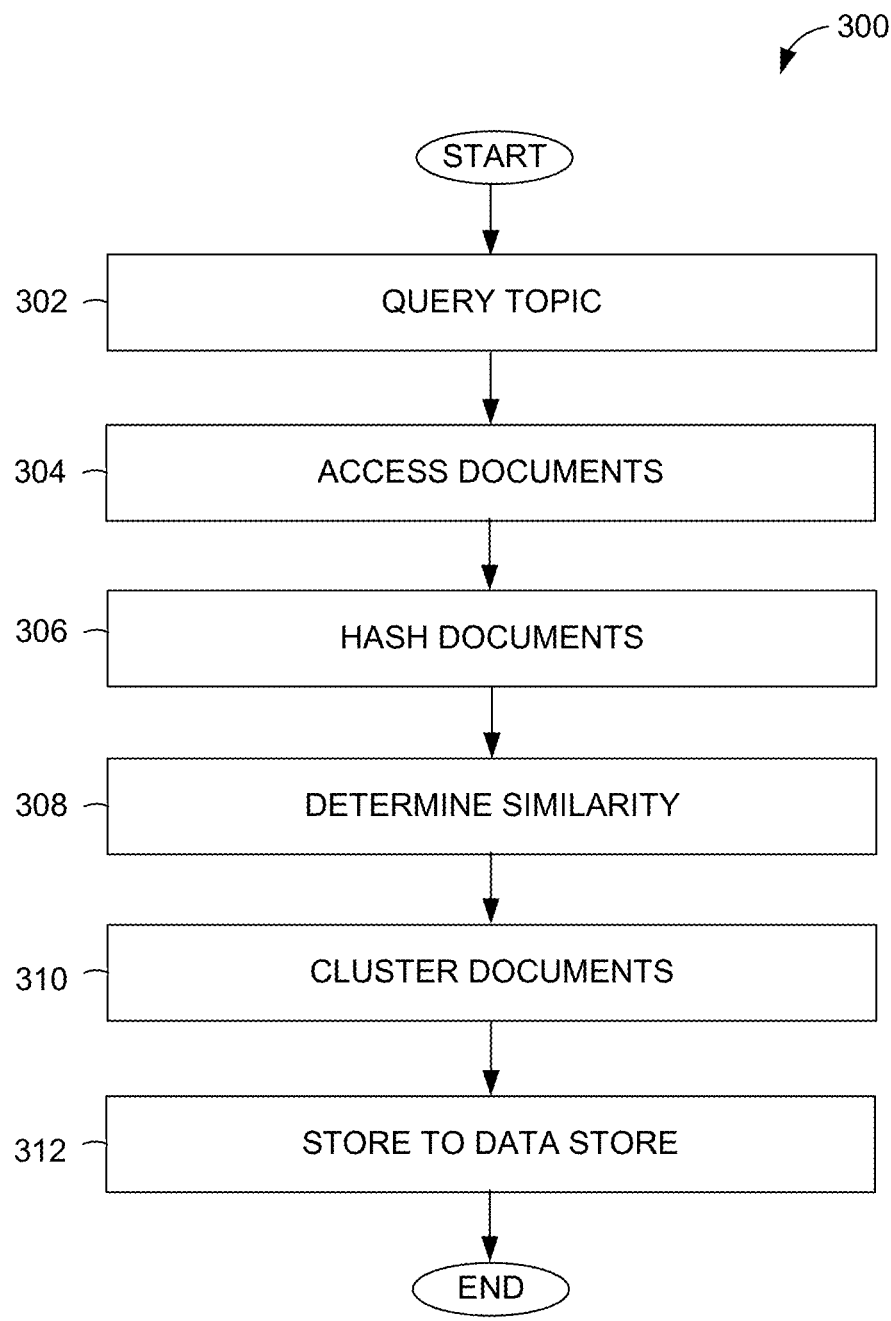
FIG. 3 is a flowchart illustrating operations of a method for generating provenance information and clusters of related documents by the provenance system, according to some example embodiments.

FIG. 3 is a flowchart illustrating operations of a method 300 for generating provenance information and clusters of related document, according to some example embodiments. Operations in the method 300 may be performed by the provenance system 102, using components described above with respect to FIG. 2. Accordingly, the method 300 is described by way of example with reference to the provenance system 102. However, it shall be appreciated that at least some of the operations of the method 300 may be deployed on various other hardware configurations or be performed by similar components residing elsewhere in the network environment 100. Therefore, the method 300 is not intended to be limited to the provenance system 102.

In operation 302, the communications module 202 queries for a particular subject matter. In example embodiments, a query of the subject matter is transmitted by the communications module 202 to the source system 106. The query may also include a time period for when documents were published (e.g., last three months) within the subject matter. The query is used to narrow down on the number of documents that are analysed by the coarse cluster engine 204. In alternative embodiments, however, all documents within a particular time period may be analysed. In these embodiments, operation 302 is not needed, is optional, or queries for all documents within the particular time period.

In operation 304, the documents to be analysed by the coarse cluster engine 204 (e.g., the document set) are accessed by the communications module 202. In some embodiments, the document set is retrieved from the source system 106 by the communications module 202. In other embodiments, the document set is received from the source system 106 (e.g., transmitted in response to the query in operation 302).

In operation 306, the hash module 206 hashes the documents in the document set. In one embodiment, the hash module 206 performs a MinHash by taking all of the accessed documents and reducing the documents down to a set of fixed dimensions that represents content features generated by a particular number of hash functions (e.g., 256 hash functions). The hash module 206 may be set to any number of hash functions. The result of the hash module 206 is a vector of 1s and 0s. In some cases, a fuzzy match is derived whereby for a given segment of text (e.g., a paragraph) having minor changes between two documents, an exact same value is output. In other cases, minor changes may result in different values.

In operation 308, the distance module 208 determines a similarity score between each of the documents. In example embodiments, the distance module 208 runs a pairwise Jaccard scoring between all document MinHash values (the MinHash strings). The result is a distance matrix between all documents with each other document. Because the Jaccard score is a ratio, it has allowable values in the range 0 to 1, whereby 0 indicates no overlap, and 1 means a perfect overlap. As a result, for every document in the document set, we have a single number that indicates what ratio of overlap there is with every other document in the document set.

In operation 310, the clustering module 210 clusters the documents based on the Jaccard score. In example embodiments, the clustering module 210 uses DBSCAN to calculate cluster boundaries. The Jaccard score for each document comprises the distance function used in the DBSCAN. The primary tuneable parameter in DBSCAN is the minimum density to allow for cluster formation or the "epsilon." The epsilon (or Jaccard requirement) may be predetermined (e.g., a default) or set by a human operator of the provenance system 102. In some embodiments, the epsilon (or Jaccard requirement) may be variable based on the subject matter of the documents. Further still, different epsilon values (or Jaccard values) may be used to generate clusters having documents of varying similarity. For example, clusters may be generated for a same subject matter at epsilon values of 0.7, 0.8, and 0.9.

In operation 312, the clustering information is stored to the data store 212. The clustering information may include, for example, an identification of the documents within each cluster along with document data (e.g., publication date, link to access). In one embodiment, the clustering information is stored in an index in the data store 212. The data store 212 is accessed, during runtime, to provide, for example, documents within the same cluster or to provide an indication of a source document for each cluster.

Figure 4:
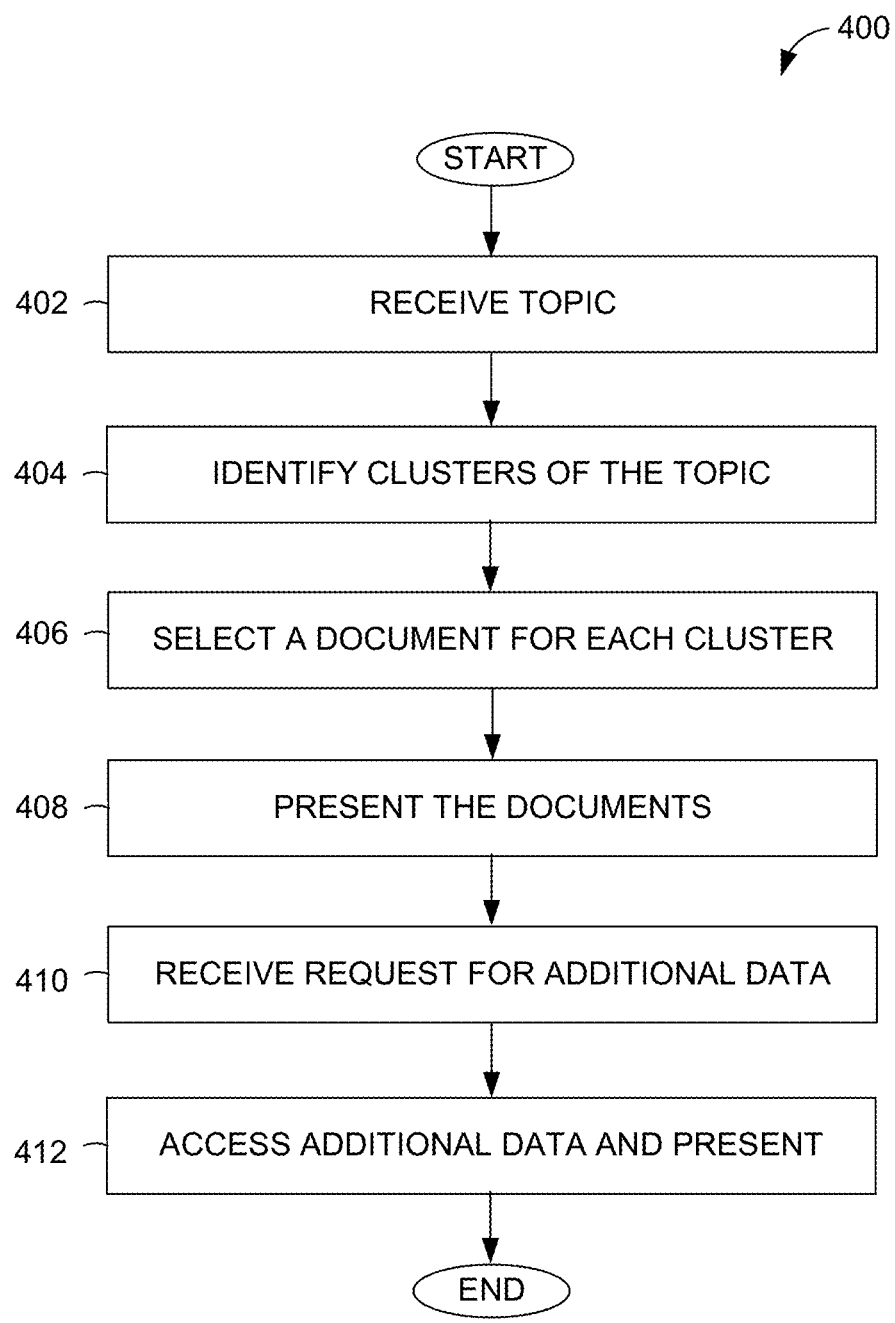
FIG. 4 is a flowchart illustrating operations of a method for presenting provenance information, according to some example embodiments.

FIG. 4 is a flowchart illustrating operations of a method 400 for presenting provenance information during runtime, according to some example embodiments. Operations in the method 400 may be performed by the provenance system 102, using components described above with respect to FIG. 2. Accordingly, the method 400 is described by way of example with reference to the provenance system 102. However, it shall be appreciated that at least some of the operations of the method 400 may be deployed on various other hardware configurations or be performed by similar components residing elsewhere in the network environment 100. Therefore, the method 400 is not intended to be limited to the provenance system 102.

In operation 402, the communications module 202 receives a topic from a user. In example embodiments, the user at the client device 110 selects a topic of interest that they would like to view. For example, the user may perform a search for a particular topic (e.g., via a search box) or select a topic from a display of multiple topics presented on a user interface to the user (e.g., top news stories or categories of the day).

In operation 404, the analysis module 214 identifies a plurality of clusters corresponding to the topic. In example embodiments, the analysis module 214 accesses the data store 212 and, using the topic, identifies a plurality of corresponding clusters. The clusters may be identified based on being categorized with a subject matter that includes or corresponds to the topic, whereby the different clusters are at a similar level of relatedness (e.g., having a similar epsilon value).

In operation 406, the analysis module 214 selects a representative document for each of the plurality of clusters corresponding to the topic. In one embodiment, the document that is most copied (e.g., headline of the document is most copied) is selected as the representative document. In an alternative embodiment, the document that is the oldest published document in the cluster is selected as the representative document.

In operation 408, the user interface module 216 causes presentation of the selected documents (e.g., displays a representation of the selected document) on a user interface. In one embodiment, the representations of the selected documents are displayed in a perspective section that comprises a set of documents intended to represent different viewpoints about the topic. In another embodiment, the representation of the selected documents may be displayed in a timeline manner based on a publication date of each of the selected documents. Further embodiments may display the selected documents in other manners. Each of the representations of the selected documents may include a title or headline of the document, a website where the document can be accessed from, and an indication of a number of similar or duplicate documents (e.g., a number of documents in the same cluster).

In operation 410, the communications module 202 receives a request for additional data from the user. In one embodiment, the request is for more information for one of the documents represented on the user interface. In another embodiment, the request is to access other documents within the same cluster as one of the selected documents.

In operation 412, the analysis module 214 accesses the additional data and the UI module 216 presents an updated user interface that includes the additional data. For example, the user interface is updated to show a timeline of publications from the cluster of the selected document, top terms found in the cluster, unique terms in the cluster, top mentions in the cluster, or additional documents (e.g., representations of additional documents) from the same cluster. For additional documents from the same cluster, the analysis module 214 may look for smaller clusters within the cluster. For example, the analysis module 214 may use a smaller epsilon value or higher Jaccard value resulting in more similar documents being grouped together (e.g., the topic is narrower). Examples of various user interfaces that can be presented by the UI module 216 are shown and discussed in more detail below.

Figure 5A:
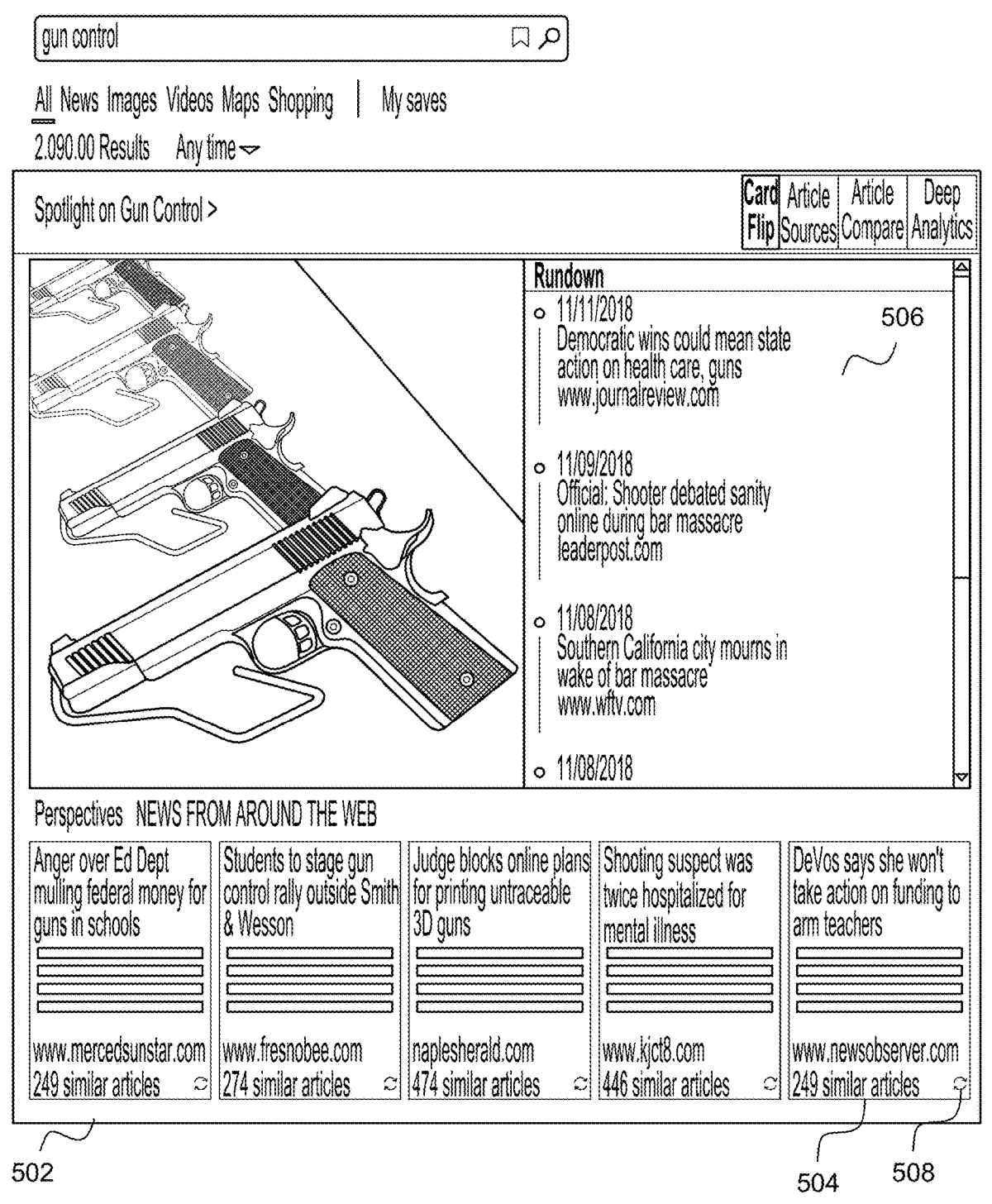
Figure 5B:
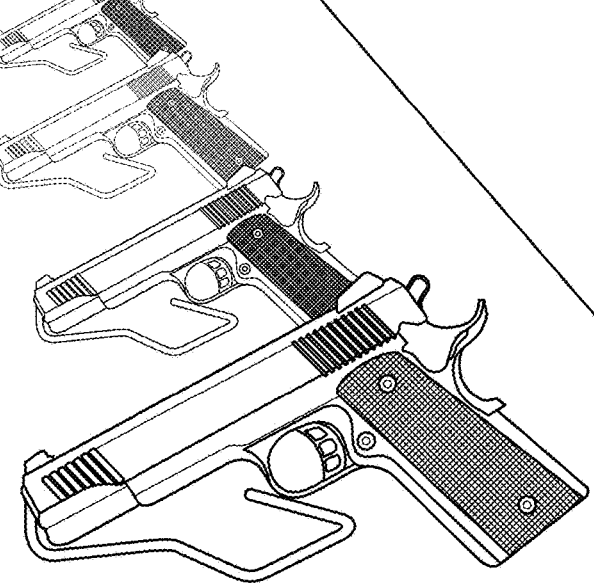
Figure 5C:
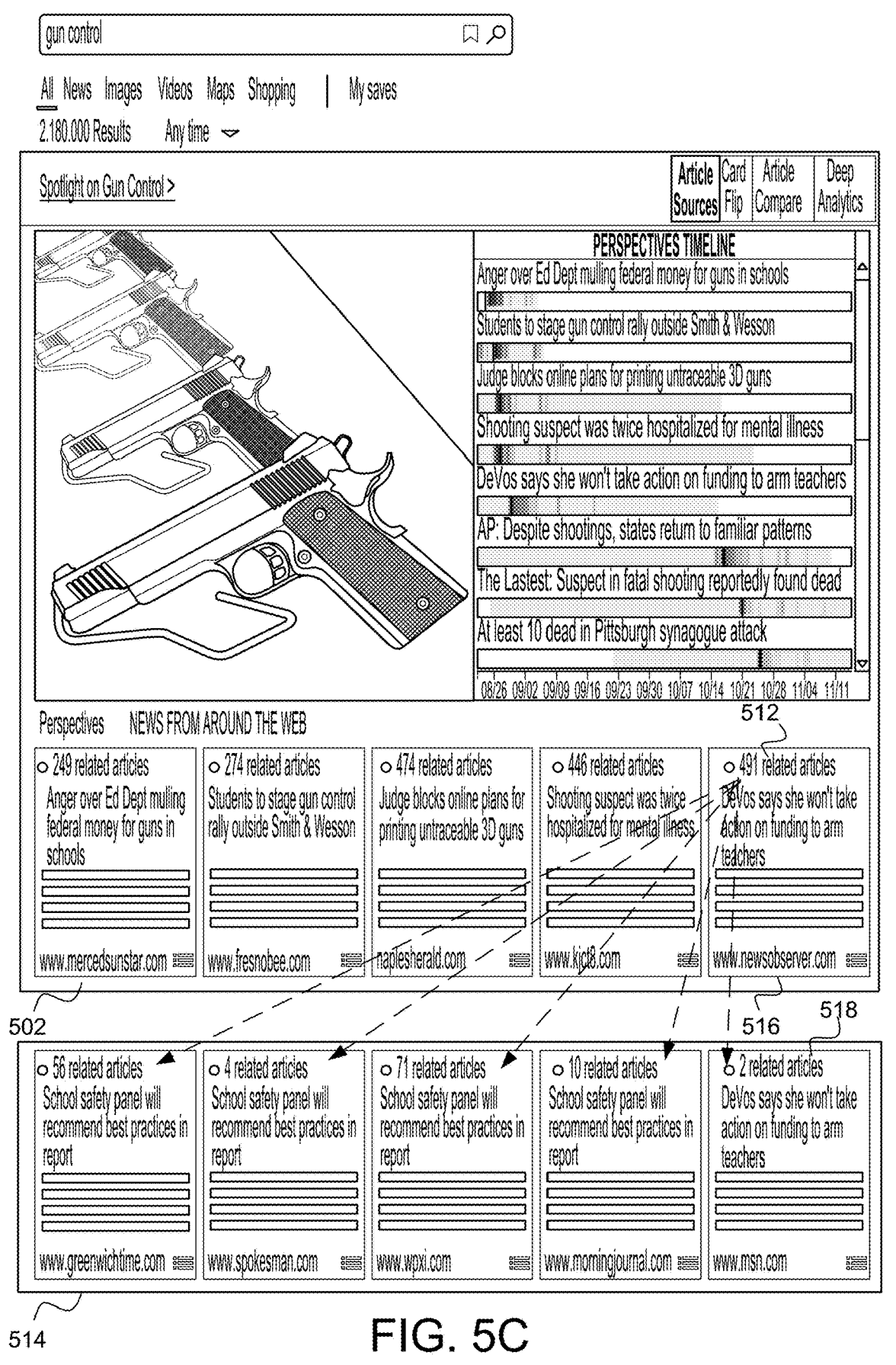

FIGS. 5A-5C are example user interfaces that illustrate the use of content provenance information. The example user interfaces are associated with a search engine that presents news articles as the documents. In example embodiments, the user at the client device 110 selects a topic of interest. For example, the user may perform a search for a particular topic or select a topic from a display of multiple topics. For example, the user selects the topic of gun control.

Once the topic is selected, the user interface of FIG. 5A is presented, in accordance with one embodiment. The user interface of FIG. 5A provides a spotlight on the topic that shows multiple perspectives on the topic. Conventionally, such a user interface is generated using hand-picked (i.e., user selected) articles for a variety of opinions. However, such human selection is subject to bias and is time consuming. Additionally, there is no reasonable way for a human to trace content from an article back to the original source(s).

By using the indexed provenance and clustering information stored in the data store 212, the articles/documents selected to populate the user interface can be comparable based on the clustering to show provenance. In one embodiment, a plurality of different clusters for the topic are accessed. The different clusters are at a similar level of relatedness (e.g., having a similar epsilon value). The analysis module 214 selects one document from each of these clusters to represent the cluster. In one embodiment, the document that is most copied (e.g., headline of the document is most copied) is selected for display in a perspectives section 502 of the user interface. In an alternative embodiment, the document that is the oldest published document in the cluster is selected as the representative document for the cluster. The perspectives section 502 comprises a set of documents intended to represent different viewpoints about the topic. As such, the documents indicated in the perspective section 502 are selected based on content or text differences and not necessarily opinion differences.

Each of the documents (or representations of the documents) displayed in the perspectives section 502 presents a title or headline of the document, the website where the document is accessed from, and an indication of a number of similar articles, in accordance with one embodiment. In example embodiments, the indication of the number of similar articles is the number of documents in the same cluster as the representative document. For example, the first document 504 is from a cluster having 249 similar articles based on the clustering by the coarse cluster engine 204.

The user interface of FIG. 5A also provides a rundown section 506 which is a historical timeline of the topic. The analysis module 214 uses a similar technique (as used to determine documents for the perspectives section) to determine documents to list in the rundown section 506 (e.g., oldest document in the cluster, document having the most copied headline). The documents are organized according to time, whereby a user can scroll along the timeline to see headlines of documents, when the documents were published to the network, and a publisher of the document. In example embodiments, the headline acts as a link to access the document from the publisher via the link.

In example embodiments, the documents in the perspectives section are represented as cards. Each of the cards has a selectable flip icon 508. By selecting the flip icon 508, the card is flipped over to show more details about the document and its cluster. More than one card can be flipped in order to allow the user to compare the documents and their details.

When the user selects the flip icon 508 on one of the cards, the card is turned over to display additional details as shown in FIG. 5B. FIG. 5B shows two cards that have been flipped. At a top of a flipped card 510 is a number of documents in the cluster. A timeline of related documents that illustrates a publication cycle for the cluster is also shown. A black line on the timeline indicates the publication of the flipped document. A denser plotting of lines indicates a greater number of documents from the cluster being published. In some embodiments, the additional details also include top terms found in the cluster, distinctive terms, and top mentions. The distinctive terms are, for example, top terms within the cluster but modulated by the top terms in the rest of the clusters (e.g., terms that are more important/salient to this cluster versus other clusters for the topic). In one embodiment, the distinctive terms are determined, by the analysis module 214 using TF-IDF (term frequency-inverse document frequency). The top mentions are structured real-world entities that are found most often in the cluster of the flipped document. In example embodiments, the analysis module 214 comprises or is coupled to an entity extractor (to extract named entities) and an index of a knowledge graph that is used to match with the extracted named entities.

Referring now to FIG. 5C, the user interface illustrates a related article drilldown. A related article tag 512 at the top of each card comprises a hyperlink. Selecting the hyperlink causes navigation into the cluster of the selected document (that includes the selected hyperlink). In example embodiments, an entire page displayed on the user interface will "re-navigate" and include the selected document as part of a query. A result of the drill down is an updated perspectives section 514 (that replaces the previous perspectives section 502 on the user interface) having documents in more narrow clusters within the larger cluster of the selected document (e.g., by using a lower epsilon value or higher Jaccard value). As such, the drilldown shows perspectives that contain more similar content. As an example, a selection of the last card 516 in the perspective section 502 results in a drilldown (e.g., the updated perspectives section 514) with five new representative documents that narrow down on the topic of the last card 516. Similar with the last card 516, each card representing the new documents includes a hyperlink 518 that causes navigation into the cluster of the new document.

FIG. 5C also shows a perspective timeline (e.g., replacing the rundown section 506). The perspective timeline provides an indication of when each respective document (e.g., in the perspective section 502) was published in a publication cycle as well as other documents from the same cluster as each respective document whereby a denser plotting of lines indicates a greater number of documents from the cluster being published.

Figure 6:
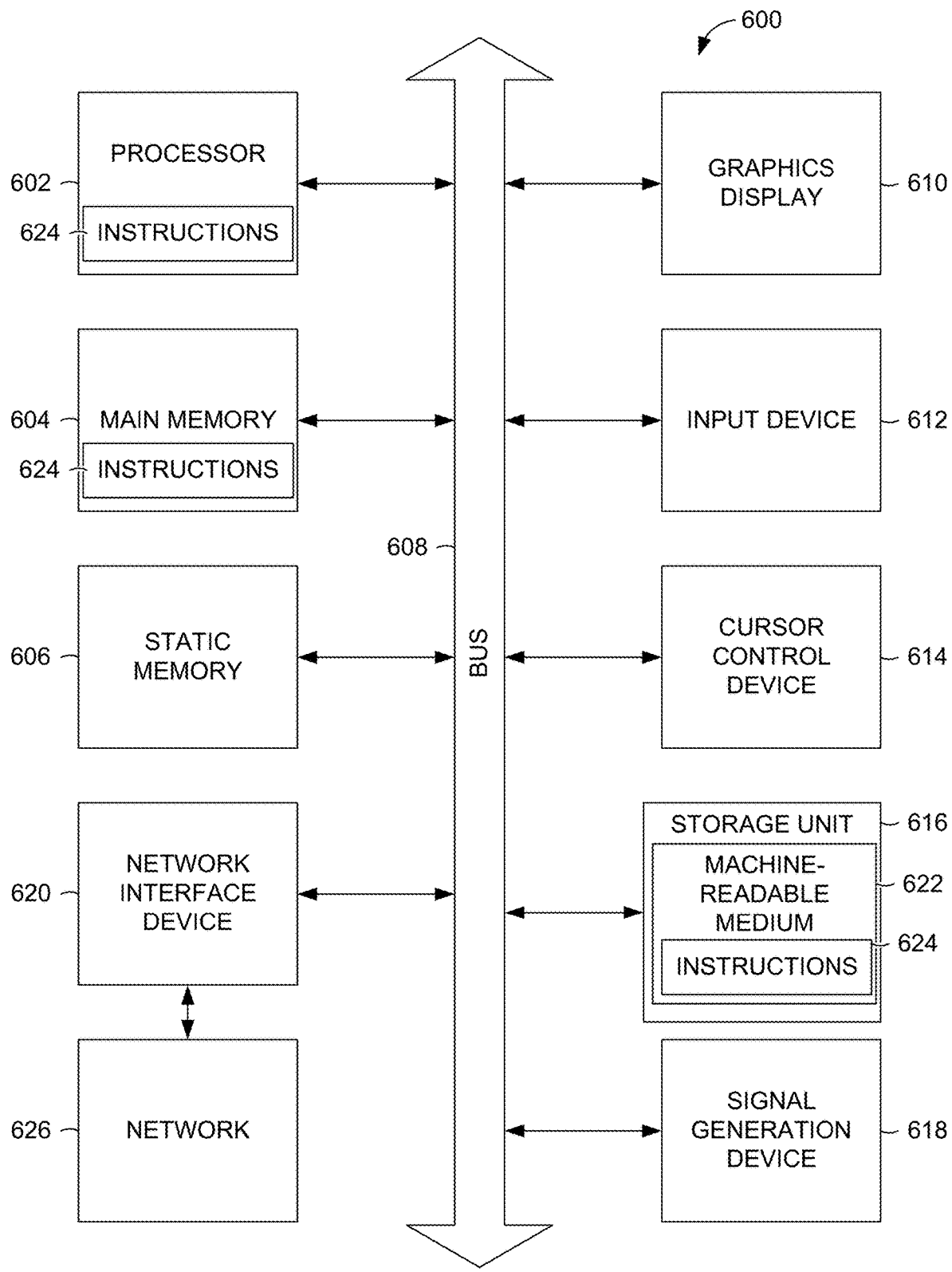
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIG. 3 and FIG. 4. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 1002 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-readable medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing content provenance. The method comprises accessing, by a network system, a plurality of documents; hashing, by the network system, each of the plurality of documents to identify one or more content features; comparing, by a processor of the network system, the content features of the plurality of documents to determine a similarity score between each of the plurality of documents; clustering, by the network system, the plurality of documents into one or more clusters based on the similarity score of each of the plurality of documents; and storing clustering information associated with the one or more clusters in a data store.

In example 2, the subject matter of example 1 can optionally include wherein hashing each of the plurality of documents comprises performing a MinHash.

In example 3, the subject matter of any of examples 1-2 can optionally include wherein the comparing the content features comprises determining Jaccard scores between each pair of documents of the plurality of documents, the Jaccard score indicating a ratio of overlapping content features.

In example 4, the subject matter of any of examples 1-3 can optionally include generating a distance matrix between each of the plurality of documents.

In example 5, the subject matter of any of examples 1-4 can optionally include wherein clustering the plurality of documents comprises using DBSCAN.

In example 6, the subject matter of any of examples 1-5 can optionally include iteratively performing DBSCAN with a decreasing epsilon value to derive clusters of related but relatively dissimilar documents.

In example 7, the subject matter of any of examples 1-6 can optionally include receiving a request for documents, the request indicating a topic; in response to receiving the request, determining, from the data store, a plurality of clusters corresponding to the topic; selecting a document from each of the plurality of clusters; and causing presentation of an indication of each of the documents from each of the plurality of clusters.

In example 8, the subject matter of any of examples 1-7 can optionally include wherein selecting the document comprises selecting a document having a most copied headline within each of the plurality of clusters.

In example 9, the subject matter of any of examples 1-8 can optionally include wherein selecting the document comprises selecting a document that has the oldest publication date within each of the plurality of clusters.

In example 10, the subject matter of any of examples 1-9 can optionally include receiving a request for additional data for a selected document; accessing publication data for documents within a same cluster as the selected document; and causing presentation of a graphical timeline illustrating publication of each of the documents within the same cluster including the selected document.

In example 11, the subject matter of any of examples 1-10 can optionally include receiving a selection of cluster link for a selected document; identifying a plurality of further documents from a same cluster as the selected document; and causing presentation of an indication of each of the further documents from the same cluster as the selected document.

Example 12 is a system for managing content provenance. The system includes one or more processors and a storage device storing instructions that, when executed by the one or more hardware processors, causes the one or more hardware processors to perform operations comprising accessing a plurality of documents; hashing each of the plurality of documents to identify one or more content features; comparing the content features of the plurality of documents to determine a similarity score between each of the plurality of documents; clustering the plurality of documents into one or more clusters based on the similarity score of each of the plurality of documents; and storing clustering information associated with the one or more clusters in a data store.

In example 13, the subject matter of example 12 can optionally include wherein hashing each of the plurality of documents comprises performing a MinHash.

In example 14, the subject matter of any of examples 12-13 can optionally include wherein the comparing the content features comprises determining Jaccard scores between each pair of documents of the plurality of documents, the Jaccard score indicating a ratio of overlapping content features.

In example 15, the subject matter of any of examples 12-14 can optionally include wherein the operations further comprise generating a distance matrix between each of the plurality of documents.

In example 16, the subject matter of any of examples 12-15 can optionally include wherein clustering the plurality of documents comprises using DBSCAN.

In example 17, the subject matter of any of examples 12-16 can optionally include wherein the operations further comprise receiving a request for documents, the request indicating a topic; in response to receiving the request, determining, from the data store, a plurality of clusters corresponding to the topic; selecting a document from each of the plurality of clusters; and causing presentation of an indication of each of the documents from each of the plurality of clusters.

In example 18, the subject matter of any of examples 12-17 can optionally include wherein selecting the document comprises selecting a document having a most copied headline within each of the plurality of clusters.

In example 19, the subject matter of any of examples 12-18 can optionally include wherein selecting the document comprises selecting a document that has the oldest publication date within each of the plurality of clusters.

Example 20 is a machine-storage medium storing instructions for managing content provenance. The machine-storage medium configures one or more processors to perform operations comprising accessing a plurality of documents; hashing each of the plurality of documents to identify one or more content features; comparing the content features of the plurality of documents to determine a similarity score between each of the plurality of documents; clustering the plurality of documents into one or more clusters based on the similarity score of each of the plurality of documents; and storing clustering information associated with the one or more clusters in a data store.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method comprising:
    prior to runtime of an analysis module:
        accessing, by a network system, a plurality of documents;
        hashing, by the network system, the plurality of documents to identify content features, the hashing comprises reducing the plurality of documents into a set of fixed dimensions that represent the content features of the plurality of documents;
        comparing, by a processor of the network system, the content features of the plurality of documents to determine a similarity score between each pair of documents of the plurality of documents;
        using density-based spatial clustering of applications with noise (DBSCAN), clustering, by the network system, the plurality of documents into one or more clusters based on similarity scores, the similarity score of each pair of documents of the plurality of documents comprising a distance function used in the DBSCAN;
        storing, for use during runtime, clustering information including identifications of the documents within each of the one or more clusters in a data store;
    at runtime of the analysis module:
        receiving a request for documents, the request indicating a topic;
        in response to receiving the request, accessing, by the analysis module, the data store storing the clustering information and identifying, from the data store, a plurality of clusters generated prior to runtime corresponding to the topic;
        for each cluster of the plurality of clusters, selecting, by the analysis module, a document that is representative of the cluster; and
        causing presentation of representations of each of the plurality of clusters by displaying each of the selected documents that is representative of their respective cluster in a section of a user interface, each of the plurality of clusters and corresponding selected documents representing a different viewpoint about the topic.

2. The method of claim 1, wherein hashing each of the plurality of documents comprises performing a MinHash.

3. The method of claim 1, wherein the comparing the content features comprises determining Jaccard scores between each pair of documents of the plurality of documents, the Jaccard score indicating a ratio of overlapping content features.

4. The method of claim 1, wherein the comparing comprises generating a distance matrix between each of the plurality of documents.

5. The method of claim 1, further comprising iteratively performing the DBSCAN with a decreasing epsilon value to derive a hierarchy of content variations.

6. The method of claim 1,
    wherein each representation includes a title of the selected document, a selectable link to a website where the selected document is accessible, and an indication of a number of similar documents in the same cluster.

7. The method of claim 1, further comprising providing a historical timeline of the topic in a second portion of the user interface, the historical timeline providing a list of documents from the plurality of clusters organized by time.

8. The method of claim 1, wherein selecting the document that is representative comprises selecting a document having a most copied headline or that has the oldest publication date within each of the plurality of clusters.

9. The method of claim 1, further comprising:
    receiving a request for additional data for a selected document;
    accessing publication data for documents within a same cluster as the selected document; and
    causing presentation of a graphical timeline illustrating publication of each of the documents within the same cluster including the selected document.

10. The method of claim 1, further comprising:
    receiving a selection of cluster link for a selected document;
    identifying a plurality of further documents from a same cluster as the selected document; and
    causing presentation of an indication of each of the further documents from the same cluster as the selected document.

11. A system comprising
    one or more hardware processors; and
    a storage device storing instructions that, when executed by the one or more hardware processors, causes the one or more hardware processors to perform operations comprising:
    prior to runtime of an analysis module:
        accessing a plurality of documents;
        hashing the plurality of documents to identify content features, the hashing comprises reducing the plurality of documents into a set of fixed dimensions that represent the content features of the plurality of documents;
        comparing the content features of the plurality of documents to determine a similarity score between each pair of documents of the plurality of documents;
        using density-based spatial clustering of applications with noise (DBSCAN), clustering the plurality of documents into one or more clusters based on similarity scores, the similarity score of each pair of documents of the plurality of documents comprising a distance function used in the DBSCAN;
        storing, for use during runtime, clustering information including identifications of the documents within each of the one or more clusters in a data store;
    at runtime of the analysis module:
        receiving a request for documents, the request indicating a topic;

in response to receiving the request, accessing, by the analysis module, the data store storing the clustering information and identifying, from the data store, a plurality of clusters generated prior to runtime corresponding to the topic;

for each cluster of the plurality of clusters, selecting, by the analysis module, a document that is representative of the cluster; and causing presentation of representations of each of the plurality of clusters by displaying each of the selected documents that is representative of their respective cluster in a section of a user interface, each of the plurality of clusters and corresponding selected document representing a different viewpoint about the topic.

12. The system of claim 11, wherein hashing each of the plurality of documents comprises performing a MinHash.

13. The system of claim 11, wherein the comparing the content features comprises determining Jaccard scores between each pair of documents of the plurality of documents, the Jaccard score indicating a ratio of overlapping content features.

14. The system of claim 11, wherein the comparing comprises generating a distance matrix between each of the plurality of documents.

15. The system of claim 11, wherein the operations further comprise iteratively performing the DBSCAN with a decreasing epsilon value to derive a hierarchy of content variations.

16. The system of claim 11, wherein
each representation includes a title of the selected document, a selectable link to a website where the selected document is accessible, and an indication of a number of similar documents in the same cluster.

17. The system of claim 11, wherein selecting the document that is representative comprises selecting a document having a most copied headline within each of the plurality of clusters.

18. The system of claim 11, wherein selecting the document that is representative comprises selecting a document that has the oldest publication date within each of the plurality of clusters.

19. A non-transitory machine-readable storage medium storing instructions that, when executed by one or more processors of a machine, cause the one or more processors to perform operations comprising:
prior to runtime of an analysis module:
accessing a plurality of documents;
hashing the plurality of documents to identify content features, the hashing comprises reducing the plurality of documents into a set of fixed dimensions that represent the content features of the plurality of documents;
comparing the content features of the plurality of documents to determine a similarity score between each pair of documents of the plurality of documents;
using density-based spatial clustering of applications with noise (DBSCAN), clustering the plurality of documents into one or more clusters based on similarity scores, the similarity score of each pair of documents of the plurality of documents comprising a distance function used in the DBSCAN; and
storing, for use during runtime, clustering information including identifications of the documents within each of the one or more clusters in a data store;
at runtime of the analysis module:
receiving a request for documents, the request indicating a topic;
in response to receiving the request, accessing, by the analysis module, the data store storing the clustering information and identifying, from the data store, a plurality of clusters generated prior to runtime corresponding to the topic;
for each cluster of the plurality of clusters, selecting, by the analysis module, a document that is representative of the cluster; and
causing presentation of representations of each of the plurality of clusters by displaying each of the selected documents that is representative of their respective cluster in a section of a user interface, each of the plurality of clusters and corresponding selected document representing a different viewpoint about the topic.

* * * * *